May 31, 1932.   W. R. TURNBULL   1,860,827
ANGLE INDICATOR FOR VARIABLE PITCH PROPELLERS
Filed July 30, 1927
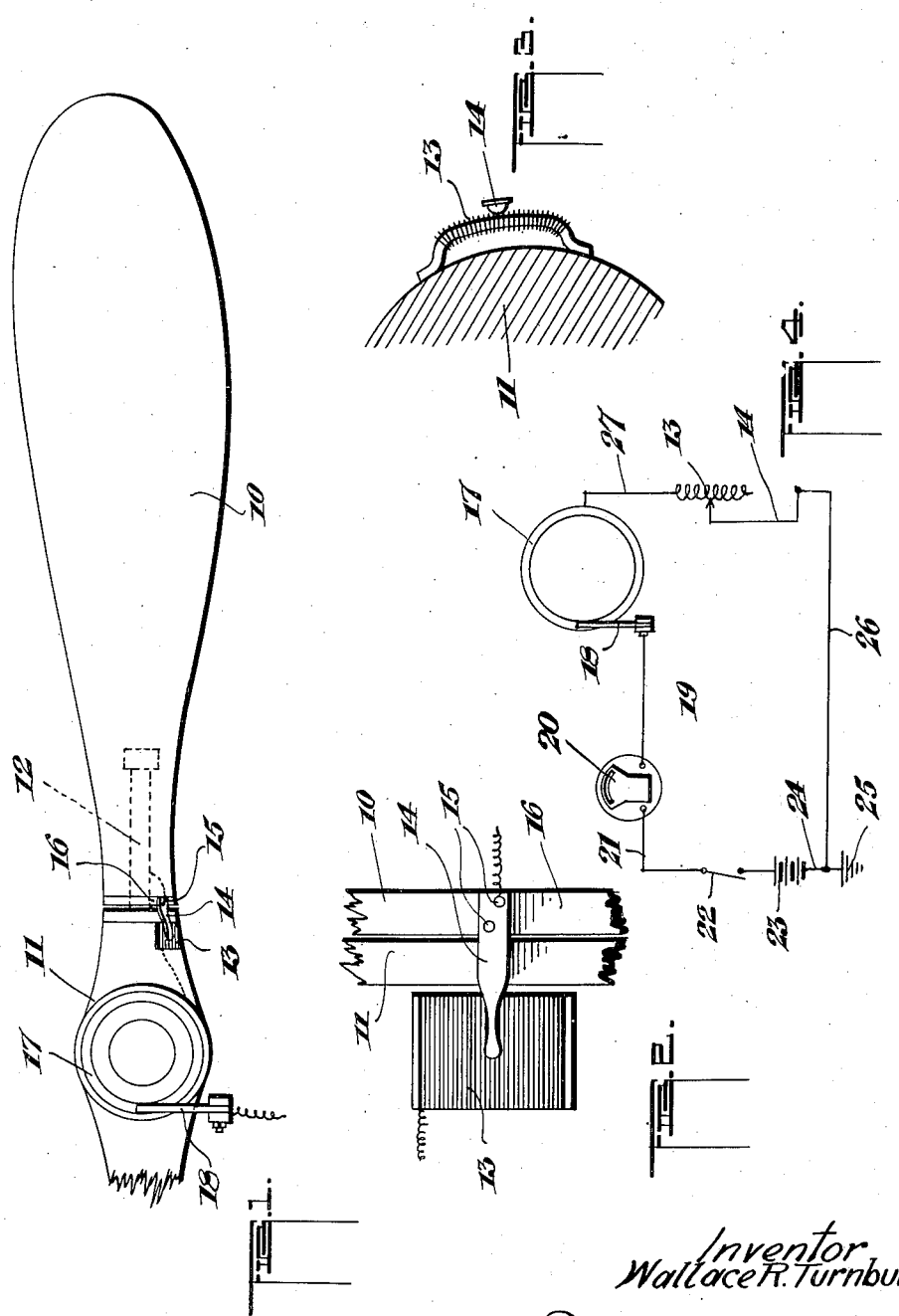
Inventor
Wallace R. Turnbull
BY
Attys Patented May 31, 1932

1,860,827

UNITED STATES PATENT OFFICE

WALLACE RUPERT TURNBULL, OF ROTHESAY, NEW BRUNSWICK, CANADA

ANGLE INDICATOR FOR VARIABLE PITCH PROPELLERS

Application filed July 30, 1927. Serial No. 209,600.

This invention relates to improvements in angle indicators for variable pitch propellers used for aeroplanes, airships, or other air-propelled vehicles or craft and the objects of the invention are to provide a simply constructed durable and accurate mechanism whereby the operator or pilot is enabled to know the angle at which the propeller blades are set even when the propeller or air screw is rotating at full speed.

The invention consists of certain novel features of construction and combination of parts that will hereinafter be described and pointed out in the specification and claims.

Referring now to the drawings in which like characters of reference indicate corresponding parts in each figure.

Figure 1 is a plan view of the hub and blade of a variable pitch propeller with the blade rotatable about a radial axis.

Figure 2 is an enlarged detail of an indicator coil with contact brush.

Figure 3 is an end view of the indicator coil, and contact brush looking outward from the propeller.

Figure 4 is a diagrammatic view of the electrical connections showing the general arrangement of the device.

Referring more particularly to the drawings 10 designates the blade of a variable pitch propeller or air screw with its hub 11, the blade being rotatable by any well known means about a radial axis, in the form of a metal spindle 12, (see dotted lines in Figure 1). An indicator comprising a coil of resistance wire 13 wound on a form of suitable shape is mounted on the hub 11 of the propeller and is spring-pressed through a spring brush 14 attached as at 15 to the root 16 of the propeller blade 10. One end of the indicator coil 13 leads to a collector ring 17 mounted on the hub 11 of the propeller and current is taken from the ring by the fixed brush 18. This current then passes through the line 19 to an ammeter 20 fixed in any suitable position visible to the operator and preferably graduated in angles. The current then passes through line 21 in which is the switch 22 to the battery 23 and thence through the line 24 to ground 25 and through the metal parts of the engine and propeller indicated by the line 26 to the brush 14 and thence through line 27 to collector ring 17.

When the blade 10 turns about its radial axis 12 the resistance of the indicator coil 13 included in the electric circuit varies. The current passing through the ammeter 20 also varies and the angle to which the blade is rotated may be taken from the ammeter reading.

From the foregoing it will be seen that when the propeller blade is turned the angle to which it is rotated and set by the mechanism disclosed in my co-pending United States application #209,599, Patent 1,793,652, patented Feb. 24, 1931, will be automatically indicated through the ammeter.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. In a device of the character described, a rotatable propeller blade, a spring-pressed resistance coil associated with said blade, an electric circuit including the resistance coil, a collector ring for the propeller, a fixed brush for the collector ring, and an ammeter, whereby on the propeller blade being rotated the resistance coil varies to vary the current passing through the ammeter to indicate the angle to which the blade is rotated.

2. In combination with an aircraft including a propeller hub equipped with radiating spindles and a propeller blade mounted to move on said spindles, an electrical resistance unit mounted on said hub, a brush carried by the propeller blade and in contact with the unit and movable thereacross when the blade turns on its axis, an electrical current collecting ring mounted on the hub, a brush engaged with said ring, and an electrical circuit including both of said brushes, the resistance unit and collecting ring and embodying an indicating means to visualize the degree of angularity of the propeller blade with respect to the propeller hub.

3. Apparatus for use with an aerial vehicle comprising, in combination, a variable pitch propeller for the aerial vehicle rotatable about an axis substantially perpendicular to itself for propelling the aerial vehicle, said propeller including a propeller hub equipped with rotating propeller blades, each of which is mounted to turn about its longitudinal axis, and an electrically operated mechanism engaged with the propeller hub and one of the propeller blades for visibly indicating at a relatively stationary point remote from the propeller the pitch angle setting of the blade with respect to the hub.

4. Apparatus for use in combination with an aerial vehicle comprising a propeller, a hub for the propeller having an axis about which the propeller is arranged to rotate, a blade for the propeller, said blade having an axis about which the blade is arranged to turn extending substantially perpendicular to the axis of the hub and substantially longitudinally of the blade, electric mechanism positioned on the hub responsive to changes in the pitch angle setting of the blade, means for transferring the effect of said mechanism to the stationary part of said aerial vehicle, and electrically operated means positioned on the stationary part of said aerial vehicle for indicating the variations in said mechanism.

5. In a device of the character described, a variable pitch propeller including a stationary bearing, a shaft mounted in said bearing and carrying a hub member, a propeller blade member, means pivoting the propeller blade member on the hub member to turn on an axis extending radially of the hub, means for turning said blade on said pivoting means and means for indicating the angular position of the blade when turned by said means including a resistance mounted on one of said members and a contact on the other, the resistance and contact also including contact means for varying the amount of effective resistance, an ammeter, a source of current, a conductor circuit including said resistance and contacts and said ammeter and source in a series circuit, the said circuit also including means for conducting current from the resistance and contact means to the stationary portion of the device.

6. In a variable pitch propeller for use with an aerial vehicle; a stationary bearing; a shaft mounted in said bearing and carrying a hub member; a propeller blade member; means pivoting the propeller blade member on the hub member to turn on an axis extending radially of the hub; and means for indicating the angular position of the blade when turned about said axis, said last named means comprising an electric circuit, a resistance coil included in said circuit and associated with said blade, means for varying the resistance of said coil responsive to the angular position of the blade, and an ammeter also included in said circuit but mounted on a stationary part of said aerial vehicle.

7. In a variable pitch propeller for use with an aerial vehicle; a stationary bearing; a shaft mounted in said bearing and carrying a hub member; a propeller blade member; means pivoting the propeller blade member on the hub member to turn on an axis extending radially of the hub; mechanism for indicating the angular position of the blade when turned about said axis, said mechanism comprising an electric circuit associated with said blade member, means located on the hub and responsive to movements of the blade member about said axis for varying the resistance in the electric circuit, means comprising a part of said electric circuit for transferring the current from the rotating propeller blade to a fixed part of the aerial vehicle, and means also comprising a part of the electric circuit and located on a fixed part of the aerial vehicle for indicating the amount of resistance in said circuit.

8. In a variable pitch propeller for use with an aerial vehicle; a stationary bearing, a shaft mounted in said bearing and carrying a hub member; a propeller blade member; means pivoting the propeller blade member on the hub member to turn on an axis extending radially of the hub; mechanism for indicating the angular position of the blade when turned about said axis, said mechanism comprising an electric circuit, means dependent on the angle of the blade for varying the flow of electric current in said circuit, and means positioned on the stationary part of the aerial vehicle for indicating variations in the flow of the electric current in said circuit.

9. In a device of the character described, a variable pitch propeller including a stationary bearing, a shaft mounted in said bearing and carrying a hub member, a propeller blade member, means pivoting the propeller blade member on the hub member to turn on an axis extending radially of the hub, means for turning said blade on said pivoting means and means for indicating the angular position of the blade when turned by said means including a resistance mounted on one of said members and a contact on the other, the resistance and contact also including contact means for varying the amount of effective resistance, a suitable measuring instrument, a source of current, a conductor circuit including said resistance and contacts and said measuring instrument and source in a series circuit, the said circuit also including means for conducting current from the resistance and contact means to the stationary portion of the device.

In witness whereof I have hereunto set my hand.

WALLACE RUPERT TURNBULL.